Figure 2:
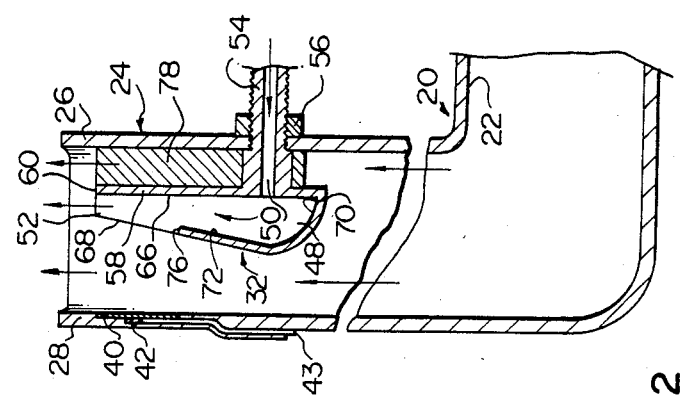
Figure 1:
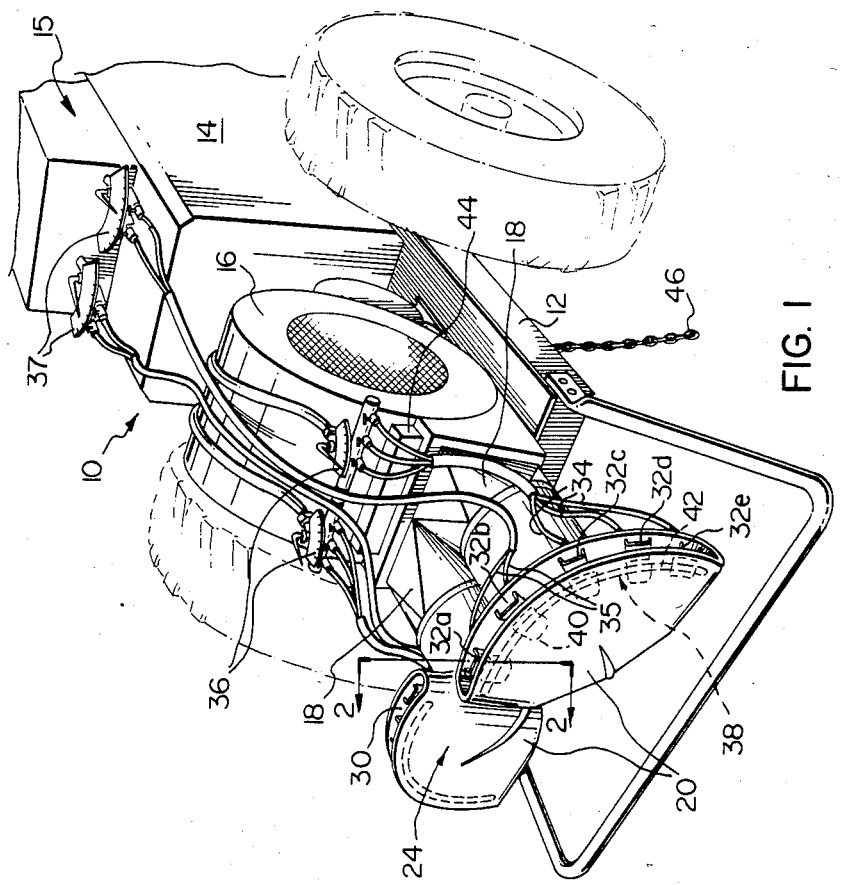

United States Patent [19]

Inculet

[11] Patent Number: 4,565,318
[45] Date of Patent: Jan. 21, 1986

[54] MULTI-LIQUID ELECTROSTATIC METHOD

[75] Inventor: Ion I. Inculet, London, Canada

[73] Assignee: Canadian Patents & Development Limited, Ottawa, Canada

[21] Appl. No.: 731,743

[22] Filed: May 7, 1985

Related U.S. Application Data

[63] Continuation of Ser. No. 493,587, May 11, 1983, Pat. No. 4,518,118.

[51] Int. Cl.$^4$ .............................. B05D 1/04; B05B 5/00
[52] U.S. Cl. ............................................. 239/3; 239/77
[58] Field of Search ..................... 239/3, 704–708, 239/77, 78, 290, 172, 690, 695; 427/27, 30

[56] References Cited

U.S. PATENT DOCUMENTS

| | | | |
|---|---|---|---|
| 2,828,158 | 3/1958 | Patterson | 239/78 |
| 3,296,015 | 1/1967 | Juvinall et al. | 427/27 |
| 3,504,854 | 4/1970 | Kinkelder | 239/142 X |
| 3,764,068 | 10/1973 | Lacchia | 239/3 |
| 3,770,482 | 11/1973 | Millar et al. | 427/27 |

*Primary Examiner*—Jeffrey V. Nase
*Assistant Examiner*—Kevin Patrick Weldon
*Attorney, Agent, or Firm*—Edward Rymek

[57] ABSTRACT

An atomized cloud of droplets having an electric charge is generated wherein different discrete parts of the cloud are formed from different liquids. The discrete part of the cloud which has an active ingredient, such as a chemical insecticide or herbicide, is contained such as by enveloping it or directing it in a particular direction by a further discrete part of the cloud that includes an inert liquid such as water. The spraying apparatus comprises a plurality of nozzles positioned in a high velocity air stream to disperse liquid and generate an atomized cloud of the liquid. The nozzles are grouped into at least two sets, each set being arranged and positioned to generate a discrete part of the cloud. An electric charge is placed on the droplets as they are emitted. Each set of nozzles further include a liquid reservoir connected to the nozzles. Each reservoir is to contain a different liquid whether it be an inert liquid or different concentrations of an active liquid.

16 Claims, 5 Drawing Figures

MULTI-LIQUID ELECTROSTATIC METHOD

This application is a continuation of application Ser. No. 493,587, filed May 11, 1983 U.S. Pat. No. 4,518,118, issued on May 21, 1985.

BACKGROUND OF THE INVENTION

The present invention relates to the spraying of liquids and, in particular, to the electrostatic spraying of liquids.

Spraying apparatus is known in which a high velocity air stream is used to atomize a liquid issuing from a nozzle for subsequent deposition on a crop or plant.

Such a device is shown in U.S. Pat. No. 3,504,854 to R. J. A. DeKinkelder were liquid is dispensed from a plurality of nozzles located within a flared outlet duct. The duct is supplied with a high velocity air stream which atomizes and entrains liquid being dispensed from the nozzles and carries the liquid into the atmosphere in the region of the crop being sprayed. This device has been commercially exploited and provides an improvement over previously known devices.

As an improvement of the DeKinkelder apparatus, the droplets are charged electrostatically as they pass through the outlet duct and thereby improve the deposition of the droplets on the crop. In Canadian Pat. No. 1,114,427 which issued on Dec. 15, 1981, to I. I. Inculet and G. S. P. Castle, a system is described wherein an electrode is placed in the duct facing the nozzles and connected to one terminal of a high voltage source. The other terminal of the source is connected through the apparatus to ground. An electric charge is induced on the droplets as they are formed in the duct. The charged droplets are attracted electrostatically to the leaves of the crop being sprayed. This has improved the deposition of liquid droplets on the crop and increased the efficiency of the spraying apparatus.

However, since electrostatically charged droplets in a cloud tend to repel one another, the cloud will expand both vertically and horizontally. Though, as described in the publication "Space Charge Effects in Orchard Spraying" by G. S. P. Castle and I. I. Inculet, in Conf. Rec. 1981, 16th Annual Meeting, IEEE Ind. Appl. Soc., pp. 1155–1160, it has been shown that the electrostatically charged liquid droplets within the cloud produced by the sprayer are attracted to ground potential, i.e. the ground cover such as the trees, leaves and other vegetation and earth, at the same time, the droplets repel one another. At a certain strata in the vertical direction in the cloud, these forces are in equilibrium so that droplets below this strata have a net force vertically down and droplets above this strata have a net force vertically upward. The droplets above the equilibrium stata, therefore, tend to be dispersed and drift to adjacent areas. This drifting is both wasteful of the chemicals being sprayed and potentially hazardous to surrounding areas.

In the horizontal direction, the droplets are also attracted to ground potential exhibited by the trees, leaves, etc. The droplets also repel one another causing the cloud to expand. Once again, one side of the cloud will tend to expand away from the intended object to be sprayed. However, in large fields or orchards this loss would be less severe since the spray would usually drift to the next row.

SUMMARY OF THE INVENTION

It is therefore an object of this invention to provide a method and apparatus for making the efficient use of materials during electrostatic spraying.

This and other objects are achieved in accordance with the present invention wherein an atomized cloud of droplets having an electric charge is generated wherein different discrete parts of the cloud are formed from different liquids. The discrete part of the cloud which includes an active liquid such as the chemical insecticide or herbicide is contained such as by enveloping it or directing it in a particular direction by a further discrete part of the cloud which includes an inert or inactive liquid, such as water.

The discrete parts of the cloud may be either horizontal or vertical layers and the liquids used to form the layers may be an inert liquid and/or an active liquid of different concentrations.

In accordance with another aspect of the present invention, there is provided a spraying apparatus comprising a plurality of nozzles positioned in a high velocity air stream to disperse liquid and generate an atomized cloud of such liquid, the nozzles are grouped into at least two sets, each set being arranged to generate a part of the cloud; electrostatic charge generating means is disposed in the air stream downstream of the nozzles to electrostatically charge droplets emitted from the nozzles; a reservoir for each set of nozzles is connected to nozzles to dispense a liquid therethrough, each reservoir containing a different liquid. The sets of nozzles may be positioned to generate horizontal or vertical layers in the cloud, each adjacent layer being a different liquid or a liquid having a different concentration of the chemical in question.

Many other objects and aspects of the invention will be clear from the detailed description of the drawings.

BRIEF DESCRIPTION OF THE DRAWINGS

FIG. 1 shows a rear perspective view of a portion of a liquid spraying apparatus.

FIG. 2 is a view taken on the line 2—2 of FIG. 1.

FIG. 3 is a rear perspective view of a nozzle shown in FIG. 2.

FIG. 4 is a front elevation of the nozzle of FIG. 3.

FIG. 5 is a diagrammatic representation of a cloud of sprayed liquid generated by the sprayer of FIG. 1.

DETAILED DESCRIPTION

It is desirable for cost and environmental purposes to have all or at least most of the herbicide or pesticide spray deposited on the desired objects, i.e. trees, leaves or ground. This is achieved to some extent by electrostatic spraying since the object to be sprayed attracts the charged droplets. The spraying method in accordance wth the present invention further enhances the electrostatic spraying method by using an inexpensive and harmless inert liquid, such as water, in an atomized electrostatic cloud to contain the atomized active liquid, which may be a herbicide or pesticide, by enveloping or directing the atomized active liquid spray. The term "active" liquid is used to designate the chemical or component one wishes to spray, while the term "inert" or "inactive" liquid is used for liquids which do not have an active coating or chemical ingredient.

The layers in the atomized electrostatic cloud may be different in size and shape, and also have different droplet charge or droplet density. The multilayered cloud gives the necessary flexibility to adjust the factors which influence the desired deposition. For example, if it is necessary, for optimum deposition results to atomize the active liquid, i.e. the insecticide or herbicide, in the form of 20 μm diameter droplets, these small droplets will be easily entrained by air currents of a few mph velocity. By generating a much larger and/or denser upper cloud layer atomized from an inert liquid to a larger droplet size, such as 50 μm, a much larger deposition force will be produced on the 20 μm droplets in the lower layer of the cloud. This is so because the settling velocity for large droplets is greater than for small droplets. For example, the settling velocity for a 1 μm diameter water droplet in air is in the order of $5 \times 10^{-2}$ cm/sec, while that of a 50 μm droplet is in the order fo 10 cm/sec. In addition to the stronger forces generated in this way, the larger droplets may also fall to the ground or vegetation, and in their fall also entrain some of the small droplets.

The multilayer cloud provides a good control of the deposition of the expensive chemical formulations, while also eliminating any concern for environmental contamination due to the drifting fractions.

All of the droplets in a multilayer sprayed cloud would normally have droplets of the same polarity. In general, it is easier to charge effectively larger droplets. Regardless of the level of charging, the identical polarity of the charge on all droplets will ensure cloud expansion and attraction to the vegetation at the same time. By making the upper layer with larger and better charged droplets, the control of the deposition of the lower layer is more easily achieved.

The same droplet mechanics applies to a vertically layered cloud. For example, a cloud could consist of three vertical layers or walls, a center vertical layer of water droplets with a vertical layer of insecticide on each side, all layers being sprayed between two rows of trees. The center water layer will perform the repelling function, directing the other two layers into the trees.

Similarly, layers with different concentrations in the chemical compositions may be desired. In such an application, the first layer with the highest concentration is subjected to the strongest electrical forces and will thus penetrate the foliage better than the subsequent layers which will deposit a larger mass mainly at the surface and in the upper part of the foliage.

Referring now to the drawings, spraying apparatus 10 comprises a trailer chassis 12 upon which is mounted a pair of liquid reservoirs 14, 15, and a fan 16, to provide a source of pressurized air. The fan 16 may be driven either by the power take-off of a tractor which is conventionally used to draw the spraying apparatus or by a separate prime mover mounted on the trailer. The outlet from the fan 16 is directed to a pair of outlet ducts 18 mounted on the rear of the trailed chassis 12. Each of the ducts 18 includes a fan shaped shroud 20, each of which is adjustably mounted on the outlet ducts for rotation about a generally mounted longitudinal axis.

The shroud 20 can best be seen with reference to FIG. 2 and comprises a tubular duct 22 connected to a fan-shaped terminal portion 24. The terminal portion 24 includes a forward wall 26 and a trailing wall 28. The forward and trailing walls are interconnected along their edges to provide a single elongated outlet mouth 30. Air is therefore blown by the fan along the tubular duct 22 and through the terminal portion 24 out of the outlet mouth 30. The shroud 20 is dimensioned to provide a high velocity air flow in the region of the fan-shaped terminal portion, typically in the order of 100 to 250 miles per hour.

A number of nozzles 32, five in the example shown are located on the forward wall 26 of the shroud. The nozzles are divided into two sets, names 32a, 32b in the first set, and 32c-32e in the second set. Each nozzle in the second set is connected to the liquid reservoir 14 by pipes 34 which are controlled by metering valves 36. Each of the nozzles of the first set is connected to reservoir 15 by a pipe 35 controlled by metering valve 37. On the trailing wall 28 of the terminal portion 24, there is imbedded flush, an electrode 38 which is formed out of a plurality of petals 40 interconnected by a conducting strip 42. Each of the petals 40 is located opposite a respective nozzle 32 so that fluid issuing from the nozzle will pass the petal. The petals 40 are typically of sector shape and are made from a conducting material which may be either a metal or a conducting plastics material. Power is supplied to the electrode 38 by means of a high tension cable 43 imbedded within the trailing wall 28 and connected to a high voltage power pack 44 mounted on the chasis adjacent the fan 16. The high tension power pack is grounded through the vehicle chassis and a trailing conductor 46 so as to be at the same potential as the surrounding environment.

Figure 4:
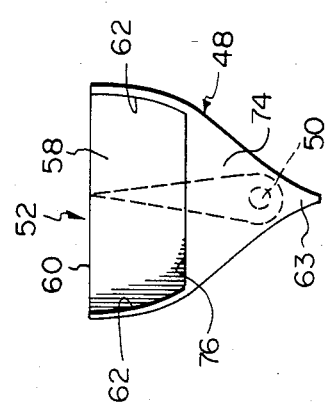
Figure 3:
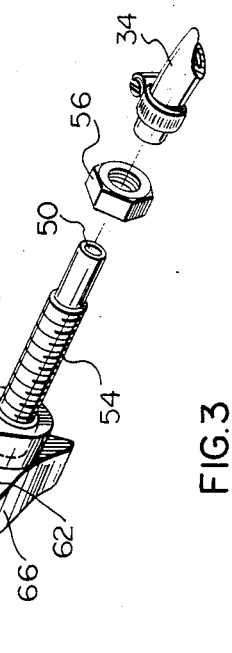

The nozzle 32 is best seen with reference to FIGS. 3 and 4, and comprises a body 48 with a fluid inlet 50 and a fluid outlet 52. The nozzle 32 is formed from a plastic material, preferably by moulding, so that in operation, with a potential being applied to the electrode 38, charge does not accumulate on the nozzle. The plastics material may be an acetal resin, such as that sold under the trade name Delrin by DuPont, although any suitable form of non-conducting plastics material may be used. The inlet 50 is formed by a tubular conduit 54 passing through the forward wall 26 to receive a pipe 34. A nut 56 is threaded onto the outer surface of the conduit 54 to secure the nozzle to the forward wall 26. The body is formed with a base 58 which is delimited by an upper edge 60 and a pair of side edges 62. Each of the side edges is shaped in the form of an ogee shape and the side edges 62 converge and intersect at a location spaced from the upper edge to define an apex 63 for the base 58. A pair of sides walls 64 are connected to the side edges and extend generally perpendicular from the base. Each side wall comprises an inner edge 66 which is connected to a respective one of the side edges 62 and an outer edge 68. The outer edge is defined by a radius portion 70 which intersects the inner edge 66 at a location corresponding to the apex 63. The outer edge is continued by a planar portion 72 which converges with the inner edge 66 toward the upper edge 60 of the base 58.

An upper wall 74 extends from the apex 63 toward the upper edge 60 of the case 58. The upper wall 74 is connected to the outer edges of the side walls 64 and terminates in a trailing edge 76 located intermediate the apex 63 and the upper edge 60. The planar portion and radius portion of the outer edge are non-tangential so that an abrupt change in the surface of the upper wall 74 occurs to promote turbulence on the upper wall 74.

A strengthening or spacer member 78 is provided on the outer surface of the base 58 and may be integrally formed with the base 58. The strengthening member 78 is generally tear-shaped and extends around the conduit 54 and up to the upper edge 60. The member 78 is of uniform depth so that the base 58 is maintained a constant spacing from the trailing wall 28 of the shroud 20 but side surfaces 80 of the strengthening member converge and intersect at a location corresponding to the upper edge 60. The member 78, therefore, provides a streamlined flow of air around the conduit 54 so that air passing between the base 58 and the forward wall 26 maintains an undisturbed high velocity flow.

By contrast, turbulence is created in the air passing over the upper wall face 74 and a pair of contra-rotating vortices are formed at opposite ends of the trailing edge 76.

Figure 5:
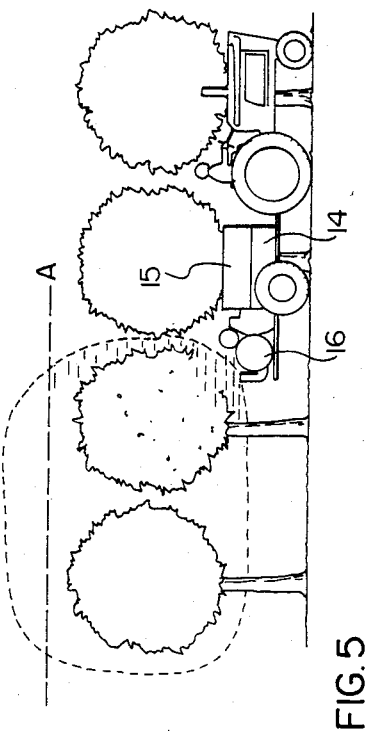

In operation, air is delivered from the fan through the outlet duct 18 and attains a high velocity in the fan-shaped terminal portion 24. A high potential is applied to the electrode 38 and a liquid is delivered from the reservoir through the pipes 34 to the inlet 50 of the nozzle 32. Air passing over the upper wall 74 atomizes the liquid delivered to the nozzle to provide droplets which are of a uniform size. The droplets acquire a charge as they pass the petals 40 and are carried by the high velocity air stream out of the elongated outlet mouth 30. The nozzles of the first set, namely 32a, 32b generate a cloud of droplets of the liquid from the reservoir 15 above a predetermined level, denoted A in FIG. 5. Similarly, the nozzles in the second set, namely 32c, d, e, generate a cloud below the level A of the liquid from the reservoir 14.

The chemical to be applied to the foliage is stored in the reservoir 14 and, therefore, supplied to the second set of nozzles 32c-e. The reservoir 15 contains an inert liquid, such as water, which is supplied to the first set of nozzles 32a, b. The cloud above level A is, therefore, composed of essentially water whereas the cloud below level A is composed of the herbicide or pesticide with which the foliage is to be treated. It will be apparent, therefore, that substantially all the droplets of chemical are positively forced to the foliage whereas the dispersed droplets consist only of water. This reduces hazards caused by drifting and also reduces the consumption of the chemical.

The same apparatus may be used to provide vertically layered clouds, such as by supplying one liquid to all of the nozzles 32a, . . . 32e in the left hand shroud 20, and a different liquid to all of the nozzles 32a, . . . 32e in the right hand shroud 20. A number of vertical or horizontal layers may be generated by supplying different liquids to different nozzles and adjusting the nozzle direction.

The degree of separation of the different liquids between the layers will depend on the amount of overspray from one nozzle to the other and to the shape of the cloud generated by the nozzle. However, these factors may be adjusted by suitable manipulation of the nozzle position, the velocity of air delivered by the fan and the volume of liquid dispensed.

Many modifications in the above described embodiments of the invention can be carried out without departing from the scope thereof and, therefore, the scope of the present invention is intended to be limited only by the appended claims.

What is claimed is:

1. A method of electrostatic spraying chemicals over a large predetermined area comprising:
generating an atomized cloud of droplets having an electric charge wherein the droplets from different discrete layers of the cloud are formed from different liquids, whereby at least one of the layers is directed by at least one other of the layers toward the predetermined area.

2. A method as claimed in claim 1 wherein the discrete layers of the cloud are generally horizontal.

3. A method as claimed in claim 1 wherein the discrete layers of the cloud are generally vertical.

4. A method as claimed in claim 1, 2, or 3 wherein the droplets in some discrete layers are formed from an inert liquid and the droplets in other discrete layers are formed from an active liquid.

5. A method as claimed in claim 1, 2, or 3 wherein the droplets in some discrete layers are formed from an active liquid selected from the group consisting of an insecticide or herbicide.

6. A method as claimed in claim 1, 2, or 3 wherein the droplets in some discrete layers are formed from active liquids having different concentrations.

7. A method of electrostatic spraying chemicals over a a large predetermined area comprising:
generating at least two separate streams of atomized electrically charged droplets from different liquids; and
directing the streams to form a layered atomized cloud, such that at least one of the layers will be directed by at least one other of the layers toward the predetermined area.

8. A method as claimed in claim 7 wherein the cloud is layered horizontally.

9. A method as claimed in claim 8 wherein the cloud has an upper layer and a lower layer.

10. A method as claimed in claim 9 wherein an inert liquid is atomized to form the upper layer droplets and an active liquid is atomized to form the lower layer droplets.

11. A method as claimed in claim 10 wherein the inert liquid is water and the active liquid is a herbicide or an insecticide.

12. A method as claimed in claim 7 in which the cloud is layered vertically.

13. A method as claimed in claim 12 in which the cloud has a center vertical layer and two side vertical layers.

14. A method as claimed in claim 13 wherein an inert liquid is atomized to form the center layer and an active liquid is atomized to form the side layers.

15. A method as claimed in claim 14 wherein the inert liquid is water and the active liquid is a herbicide or an insecticide.

16. A method as claimed in claim 7 wherein the different liquids consist of an active liquid having different concentrations.

* * * * *